(12) United States Patent
Ahmed et al.

(10) Patent No.: US 11,015,991 B2
(45) Date of Patent: May 25, 2021

(54) BENDING SENSOR FOR FLEXIBLE DISPLAY PANEL

(71) Applicant: INTEL CORPORATION, Santa Clara, CA (US)

(72) Inventors: Khaled Ahmed, Anaheim, CA (US); Michael Rosenzweig, San Ramon, CA (US)

(73) Assignee: INTEL CORPORATION, Santa Clara, CA (US)

( * ) Notice: Subject to any disclaimer, the term of this patent is extended or adjusted under 35 U.S.C. 154(b) by 3 days.

(21) Appl. No.: 16/219,012

(22) Filed: Dec. 13, 2018

(65) Prior Publication Data
US 2019/0113952 A1    Apr. 18, 2019

(51) Int. Cl.
*G01L 1/20* (2006.01)
*G06F 1/16* (2006.01)
*G01L 5/165* (2020.01)

(52) U.S. Cl.
CPC .............. *G01L 1/205* (2013.01); *G01L 5/165* (2013.01); *G06F 1/1637* (2013.01); *G06F 1/1643* (2013.01); *G06F 1/1652* (2013.01); *G06F 1/1684* (2013.01)

(58) Field of Classification Search
CPC ................... G06F 3/044; G06F 3/0414; G06F 2203/04102; G06F 3/0416; G06F 1/1652; G06F 3/04164; G06F 3/047; G06F 2203/04111; G01D 5/24; A61B 2562/0214
See application file for complete search history.

(56) References Cited

U.S. PATENT DOCUMENTS

| | | | |
|---|---|---|---|
| 2014/0028597 A1* | 1/2014 | Cho | G06F 3/0488 345/173 |
| 2018/0191391 A1* | 7/2018 | Kim | H04B 1/3827 |
| 2018/0240439 A1* | 8/2018 | Zeng | H01L 27/3227 |
| 2019/0025957 A1* | 1/2019 | Lee | G06F 1/1643 |

* cited by examiner

*Primary Examiner* — Gerald Johnson
(74) *Attorney, Agent, or Firm* — Kacvinsky Daisak Bluni PLLC (57) ABSTRACT

Disclosed herein are flexible display panels and bend detection circuits for flexible display panels where the bend detection circuit can be formed on a flexible substrate of the flexible display panel stack. The bend detection circuit including a number of sensor elements arranged to change an electric response to an applied electric signal based on an applied physical force. The bend detection circuits also including a bend sensing circuit arranged to measure a time delay of the number of sensor elements to the applied electric signal.

18 Claims, 8 Drawing Sheets

BENDING SENSOR FOR FLEXIBLE DISPLAY PANEL

TECHNICAL FIELD

Embodiments described herein generally relate to flexible display panels and particularly to sensors for detecting bending anywhere on a flexible display panel.

BACKGROUND

Flexible displays are capable of displaying images even when bent or deformed. However, the displayed image may be distorted due to the bending or deformation of the flexible display. Thus, there is a need to sense or determine a degree of bending of the flexible display so as to adjust the displayed image to mitigate distortion due to the bending.

BRIEF DESCRIPTION OF THE DRAWINGS

FIG. 9 illustrates an embodiment of a platform.

DETAILED DESCRIPTION

The present disclosure is generally directed to integrating a bending detection sensor into a flexible display panel. In general, the present disclosure provides a bending detection sensor including an array of sensing elements with an electric response that changes when bent. The bending detection unit can be manufactured and/or coupled to a flexible display, or to the substrate of a flexible display. As such, when the flexible display is bent, a degree of bending can be determined based in part on the electric response of the sensing elements in the array.

As detailed above, flexible displays are manufactured to be able to display images, even when bent. Typically, the illumination elements, switching elements, connective wirings, etc. are all formed on a flexible substrate and from material having flexibility, such as plastic. Modern devices, such as, smart phones and tablet computers may include flexible displays. When the flexible display device is bent, however, displayed images may be distorted. To mitigate or correct this distortion, the degree of bending is measured, and the displayed image adjusted accordingly.

Conventionally, flexible displays are coupled to separately manufactured bending sensors. This however, presents a number of challenges. It is difficult to measure bending across the entire display. Furthermore, the thickness of the overall display is increased due to the added z-height from the separately manufactured bending sensor. Furthermore, overall cost of the flexible display is increased as additional parts are manufactured and assembled to form the display.

The present disclosure provides an integrated bending sensor, which reduces z-height and manufacturing costs and complexity.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a feature, structure, or characteristic described relating to the embodiment is included in at least one embodiment. The appearances of the phrases "in one embodiment," "in some embodiments," and "in various embodiments" in various places in the specification are not necessarily all referring to the same embodiment.

Figure 1:
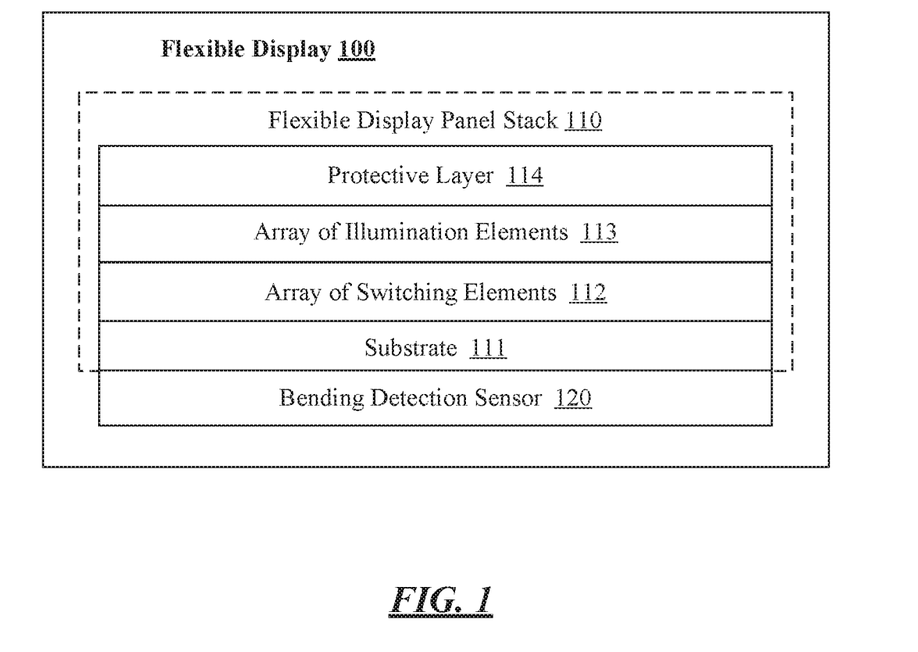
FIG. 1 illustrates an embodiment of a display panel stack.

FIG. 1 illustrates a cut away side view of a flexible display 100, arranged according to various embodiments of the present disclosure. The flexible display 100 includes a flexible display panel stack 110 and an integrated bending detection sensor 120. The flexible display 100 may be implemented in a variety of displays and/or devices including displays. For example, the flexible display 100 may be implemented in a monitor, a television, a smart phone, a Ultrabook, a tablet, a laptop, a wearable computing device (e.g., a watch, glasses, a headset, or the like), a home automation device (e.g., a thermostat, a control panel, a media device, or the like).

It is noted, with some implementations, a flexible display can be provided with both non-bending and bending areas. Said differently, a flexible display can be provided where some areas of the flexible display are flexible as described herein and other areas of the display are not flexible. As a specific example, a flexible display could be provided where a center strip or center portion of the display is flexible (or bendable) and outer portions or sides of the display are not flexible (non-bending). Thus, the flexible display could be folded such that the non-bending areas face each other (e.g., like a book, or the like).

The flexible display panel stack 110 can include a flexible substrate 111, an array of switching elements 112, an array of illumination elements 113, and a protective layer 114. It is important to note, that the flexible display panel stack 110 can include more layers than depicted, less layers than depicted, or different configurations of layers than depicted. For example, the flexible display panel stack 110 may be implemented with various touch (e.g., capacitive, or the like) layers, diffusive layers, reflective layers, privacy layer, pressure layers, polarizer layers, etc. Examples are not limited in this context. Accordingly, an exhaustive depiction and listing of the number and variety of layers that may be included in the flexible display panel stack 110 is not made for purposes of brevity. The components of the flexible display panel stack 110 depicted in FIG. 1 are selected for purposes of clarity of presentation only and not to be limiting. Importantly, the flexible display panel stack 110 includes the flexible substrate 111.

In general, flexible display panel stack 110 is formed on a flexible substrate 111, such as, for example, a polyimide film. The array or switching elements 112 can comprise a number of switching elements arranged to cause light to be illuminated by the array of illumination elements 113 to depict an image by the flexible display 100.

In some examples, the array of switching elements 112 can include thin-film-transistor (TFT) components. The array of illumination elements 113 can include any of a variety of elements arranged to emit light (e.g., μLED or OLED). The array of switching elements 112 and the array of illumination elements 113 are coupled and arranged to form an array of pixels, which can selectively emit light (e.g., on a per pixel basis) to display an image. The protective layer 114 may comprise one or more films, layers, or components to protect the flexible display panel stack 110. For example, the protective layer 114 may be acrylic, a flexible film, or the like.

The present disclosure provides bending detection sensor 120 integrated into the flexible display 110 and coupled to the flexible display stack 110. With some examples, bending detection sensor 120 can be formed during manufacturing (or formation) of flexible display stack 110. In some examples, the bending detection sensor 120 can be formed proximate to bending areas (e.g., flexible areas) of a flexible display having both bending and non-bending areas. In general, the bending detection sensor 120 comprises a number of sensing elements (see FIG. 2) where a response (e.g., resistance, or the like) to an electric signal changes when bent. As such, a degree or amount of bending of the flexible display 110 can be determined.

We propose a display device that comprises a flexible substrate including a display area and a bezel area surrounding the display area; and a bending sensor including a curved unit disposed in the bezel area and in which an electric change occurs when the flexible substrate is bent, and a detection unit detecting bending information by sensing the electric change. The detection unit may sense the electric change occurring in the curved unit during bending, compare the electric change with an electric change value depending on a bending direction and a bending angle stored in a memory, and calculate a bending direction and a bending angle of the display device.

Figure 2:
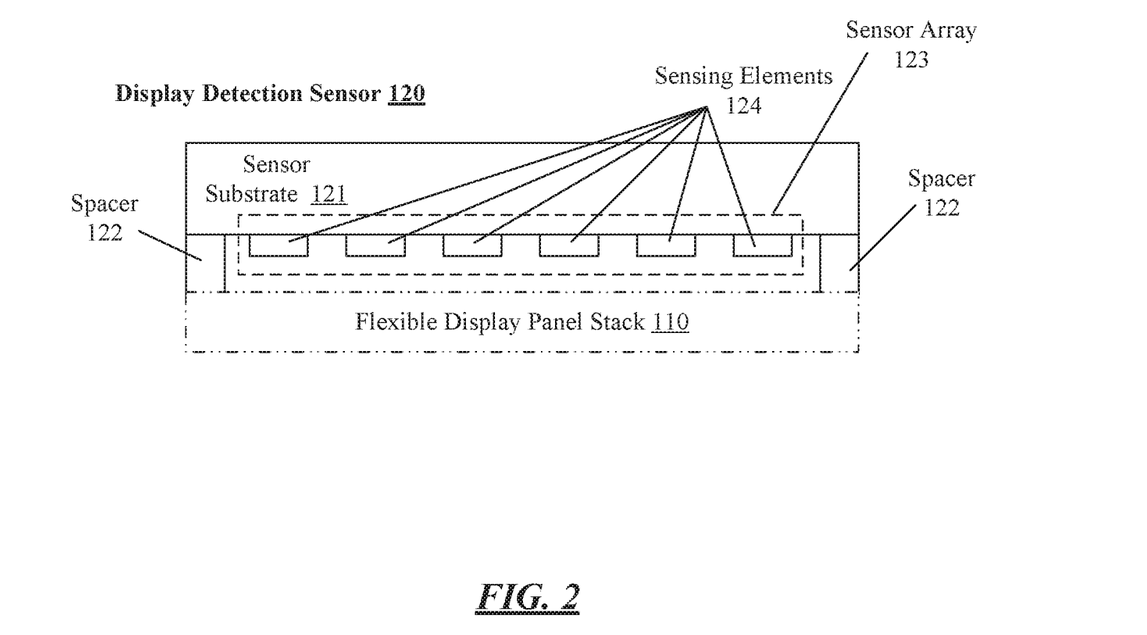
FIG. 2 illustrates an embodiment of a portion of a display panel stack.

FIG. 2 illustrates a cut away side view of a portion of the flexible display 110 of FIG. 1, showing the bending detection sensor 120 in greater detail, arranged according to various embodiments of the present disclosure. With some examples, bending detection sensor can be disposed on a backside of the flexible display panel stack 110, such as, for example, disposed on a backside of the flexible substrate 111.

Bending detection sensor 120 can include a sensor substrate 121 spacers 122, a sensor array 123 including sensor elements 124 formed on the sensor substrate 121. In general, the spacers 122 are disposed between the sensor substrate 121 and the flexible substrate 111 and provide a cavity or region in which the sensor array 124 is disposed. With some examples, spacers 122 are disposed at the edges of the sensor substrate In general, the sensor array includes a number of sensor elements 124, which are spaced apart from one another or arranged in a grid or array. Each of the sensor elements 124 comprises a piezoresistive material, where a resistance of the material varies according to an applied force. For example, the sensor array 123 and included sensor elements 124 can be formed from a graphene-metal mesh composite or carbon nanotube-metal mesh composite.

Figure 3:
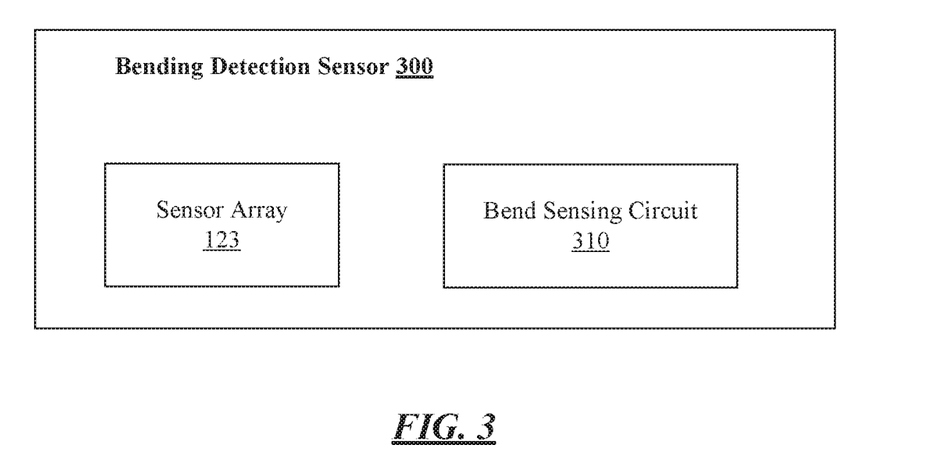
FIG. 3 illustrates a first example of an embodiment of a bending detection sensor.
Figure 4:
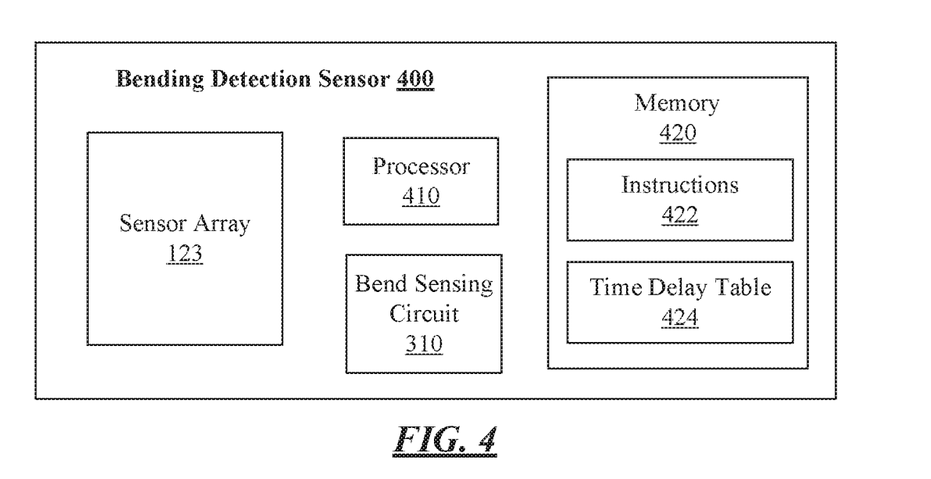
FIG. 4 illustrates a second example of an embodiment of a bending detection sensor.

FIGS. 3 and 4 illustrate bending detection sensors 300 and 400, respectively. The bending detection sensors 300 and 400 could be implemented as bending detection sensor 120 of FIGS. 1 and 2 and each include a sensor array 123.

Turning more particularly to FIG. 3, bending detection sensor 300 can include sensor array 123 and bend sensing circuit 310. Bend sensing circuit 310 is electrically coupled to sensor elements (e.g., sensor elements 124, or the like) of sensor array 123 and arranged to measure a change in resistance of ones of the sensor elements. For example, bend sensing circuit 310 can include a voltage source and capacitor arranged to electrically couple to the sensor elements of sensor array 123 to form a time delay measurement circuit. Thus, as resistance of the sensor elements changes (e.g., due to bending of the flexible display, or the like) the time delay will change. In some examples, bend sensing circuit 310 can be arranged to output a signal indicative of this time delay, for example, to a display driver for the flexible display, or the like.

With some examples, sensor elements 124 of sensor array 123 can be coupled to bend sensing circuit in rows and columns. For example, row select lines can couple rows of sensor elements 124 while column select lines can couple columns of sensor elements 124. Thus, row select lines and column select lines could be used to sense degree of bending in various coordinates of the surface of the bending detection senor 300.

Turning more particularly to FIG. 4, bending detection sensor 400 can include sensor array 123, bend sensing circuit 310, processor 410 and memory 420. Memory 420 can include instructions 422 and time delay table 424. During operation, processor 410, in executing instructions 422, can receive output from bend sensing circuit 310 (e.g., indicative of a time delay of sensing elements of sensor array 123, or the like). Processor 410, in executing instructions 422, can derive a degree of bending based on the received signals from bend sensing circuit 310 and time delay table 424. With some examples, processor 410, in executing instructions 422 can modify images to be displayed on flexible display in which bending detection sensor 400 is coupled.

For example, in executing instructions 422 processor 410 can move images displayed on a portion of flexible display bent greater than a threshold degree or angle to other portions of the flexible display (e.g., to a non-bending region, or the like). As another example, in executing instructions 422 processor 410 can modify images displayed in the bending region of flexible display to counter or mitigate distortions caused by the bending. For example, images can be modified based in part on the degree of bending to reduce distortions of the displayed image.

With some examples, the processor 410 may include circuitry or processor logic, such as, for example, any of a variety of commercial processors. In some examples, the processor 410 may include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, the processor 410 may include graphics processing portions and may include dedicated memory, multiple-threaded processing and/or some other parallel processing capability.

Memory 420 may include logic, a portion of which includes arrays of integrated circuits, forming non-volatile memory to persistently store data or a combination of non-volatile memory and volatile memory. It is to be appreciated, that memory 420 may be based on any of a variety of technologies. In particular, the arrays of integrated circuits included in memory 420 may be arranged to form one or more types of memory, such as, for example, dynamic random access memory (DRAM), NAND memory, NOR memory, or the like.

Figure 5:
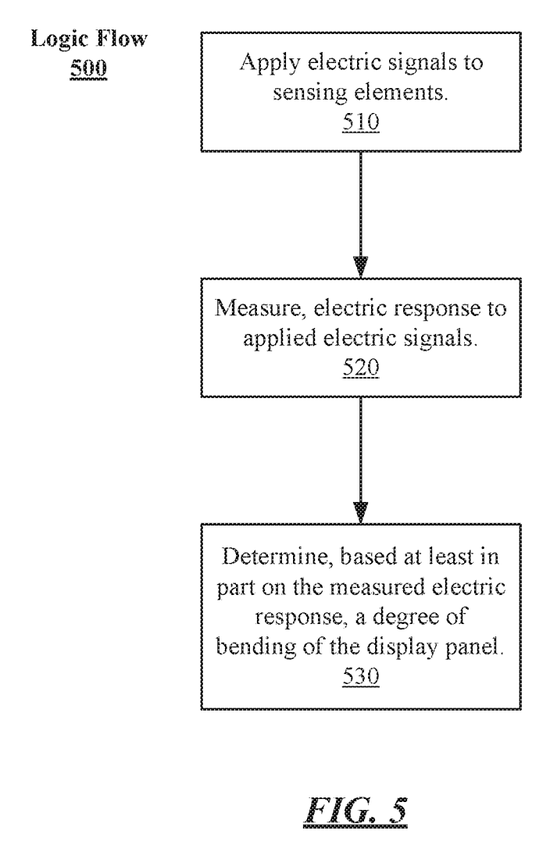
FIG. 5 illustrates a first example of embodiment of a logic flow.

FIG. 5 illustrates a logic flow 500 for measuring a degree of bending according to some examples of the present disclosure. Logic flow 500 can be implemented to measure a degree of bending of flexible display 100 (or a portion of flexible display 100) using bending detection sensor 120. Logic flow 500 is described with reference to bending detection sensor 400 of FIG. 4. However, examples are not limited in this context.

Logic flow 500 can begin at block 510. At block 510 "apply electric signals to sensing elements" electric signals can be applied to sensing elements of a sensing array of a bending detection sensor, such as, sensor 400. For example, bend sensing circuit 310 can apply electric signals to sensor elements (e.g., elements 124) of sensor array 123.

Continuing to block 520 "measure and electric response to the applied electric signals" a response to the electric signals applied at block 510 can be measured. For example, bend sensing circuit 310 can measure a time delay associated with sensor elements 123. For example, time delays associated with different coordinates on a surface of the bending detection sensor 400 can be measured by bend sensing circuit 310.

Continuing to block 530 "determine, based at least in part on the measured electric response, a degree of bending of the display panel" a degree of bending of portions, coordinates, or the like of the flexible display 100 can be determined based on the response measured at block 520. For example, processor 410, in executing instructions 422, can determine a degree of bending for different portions (e.g., coordinates) of flexible display 100 based on the time delay measured by sensing circuit 310 and the time delay table 424.

Figure 6A:
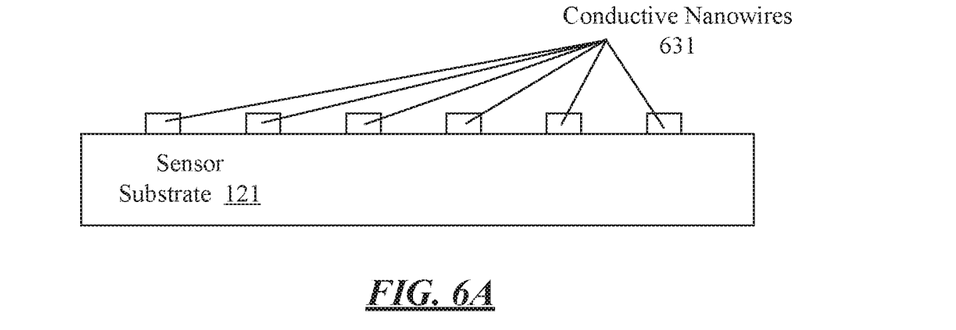
FIGS. 6A-6C illustrate an example of a portion of a bending detection sensor in various stages of manufacture.
Figure 6B:
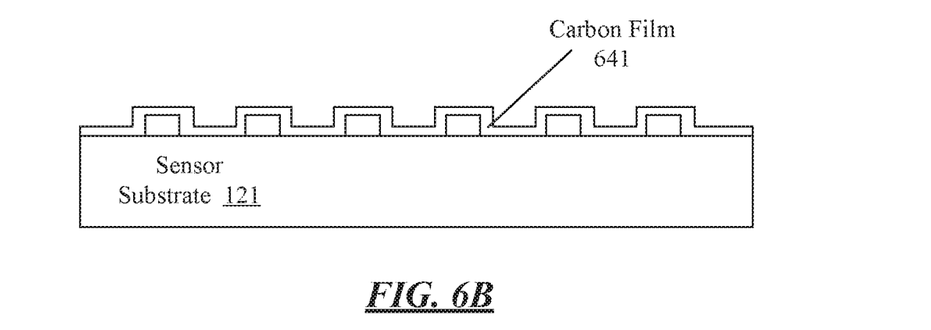
Figure 6C:
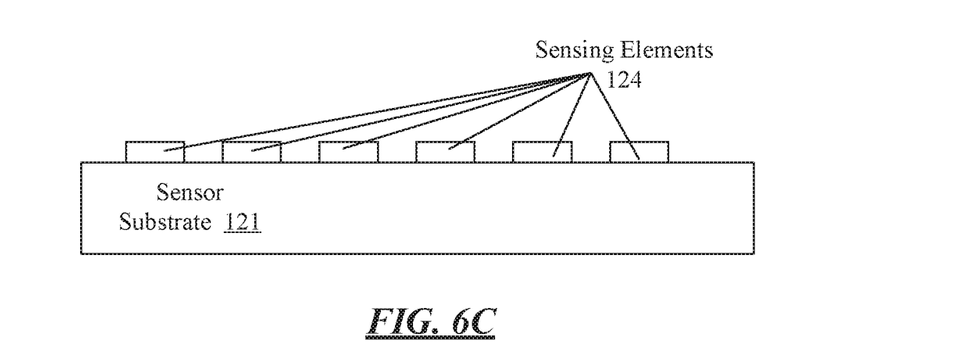
Figure 7:
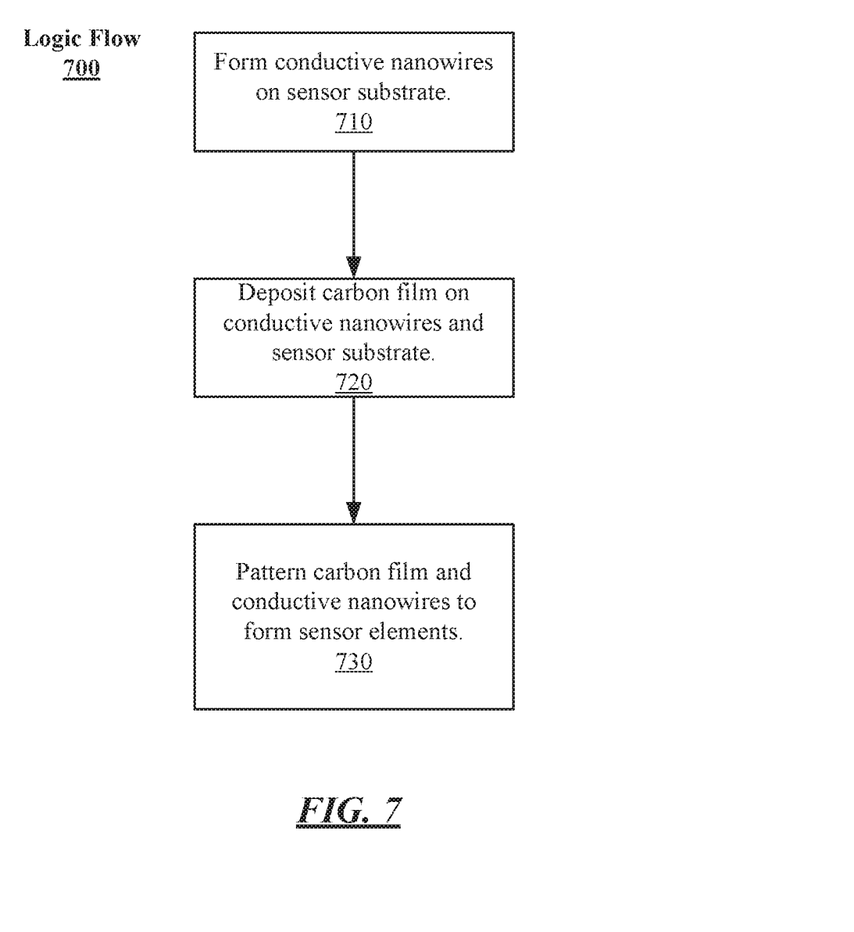
FIG. 7 illustrates a second example of embodiment of a logic flow.

FIGS. 6A, 6B, and 6C illustrate a portion of an example bending detection sensor 620 during various stages of manufacture. FIG. 7 illustrates a logic flow 700 to manufacture a bending detection sensor, according to various embodiments. Logic flow 700 can be implemented to manufacture the bending detections sensors described herein. Logic flow 700 is described with reference to, and in conjunction with, the bending detection sensor 620 shown in FIGS. 6A-6C for clarity of presentation.

Logic flow 700 can begin at block 710 "form conductive nanowires on a sensor substrate" conductive nanowires can be formed on a sensor substrate. For example, conductive nanowires 631 can be formed on sensor substrate 621 as shown in FIG. 6A. In some examples, the conductive nanowires 631 can be copper (Cu) or a copper alloy. With some examples, the conductive nanowires 631 are deposited sensor substrate 621. In some examples, conductive nanowires 631 are grown on sensor substrate 621. Conductive nanowires 631 can be deposited or grown in various patterns or arrangements or can be grown or deposited in a random arrangement.

Continuing to block 720 "form carbon film over conductive nanowires" carbon film can be formed on the sensor substrate over the conductive nanowires. For example, carbon film 641 can be formed sensor substrate 621 overlaying conductive nanowires 631 as shown in FIG. 6B. In some examples, the carbon film can be carbon nanotubes or a graphene mesh. In some examples, the carbon film (or mesh) can be deposited onto the sensor substrate 621 over the conductive nanowires 631 via deposition process, such as, for example, plasma-enhanced chemical vapor deposition (PECVD).

Continuing to block 730 "pattern the carbon film and conductive nanowires to form sensor array" the carbon film and conductive nanowires can be patterned to form sensor elements of the sensor array. For example, the carbon film 641 and conductive nanowires 631 can be patterned to form sensor elements 624 of sensor array 623 as shown in FIG. 6C. In some example, the carbon film 641 and conductive nanowires 631 can be patterned using an oxygen ($O^2$) plasma and wet etch process.

Figure 8:
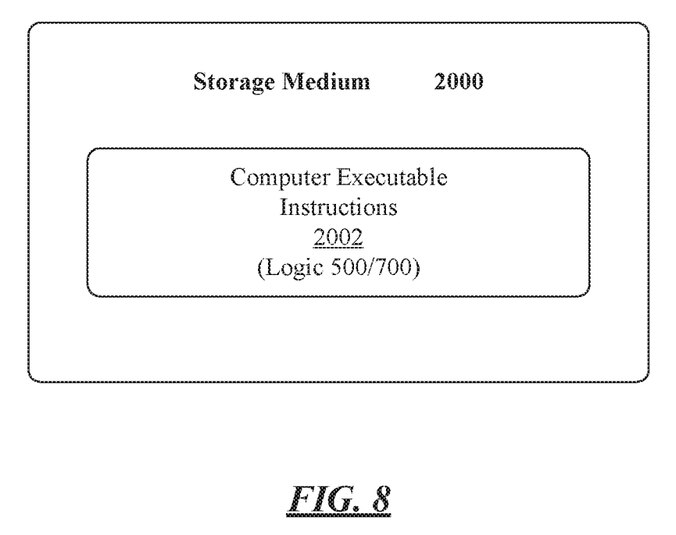
FIG. 8 illustrates an embodiment of a storage medium.

FIG. 8 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement logic flow 500 and/or logic flow 600. For example, storage medium 2000 can be coupled to manufacturing equipment (e.g., pick and place equipment, lithographic equipment, or the like) and arranged to manufacture a display panel stack with individual digital polarizers as discussed herein.

Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

FIG. 9 is a diagram of an exemplary system embodiment and, depicts a platform 3000, which may include various elements. For instance, this figure depicts that platform (system) 3000 may include a processor/graphics core 3002, a chipset 3004, an input/output (I/O) device 3006, a random-access memory (RAM) (such as dynamic RAM (DRAM)) 3008, and a read only memory (ROM) 3010, panel 3020 (e.g., flexible display 100 including bending detection sensor 120, bending detection sensor 300, bending detection sensor 400, or the like) and various other platform components 3014 (e.g., a fan, a cross flow blower, a heat sink, DTM system, cooling system, housing, vents, and so forth). System 3000 may also include wireless communications chip 3016 and graphics device 3018. The embodiments, however, are not limited to these elements.

As depicted, I/O device 3006, RAM 3008, and ROM 3010 are coupled to processor 3002 by way of chipset 3004. Chipset 3004 may be coupled to processor 3002 by a bus 3012. Accordingly, bus 3012 may include multiple lines.

Processor 3002 may be a central processing unit comprising one or more processor cores and may include any number of processors having any number of processor cores. The processor 3002 may include any type of processing unit, such as, for example, CPU, multi-processing unit, a reduced instruction set computer (RISC), a processor that has a pipeline, a complex instruction set computer (CISC), digital signal processor (DSP), and so forth. In some embodiments, processor 3002 may be multiple separate processors located on separate integrated circuit chips. In some embodiments processor 3002 may be a processor having integrated graphics, while in other embodiments processor 3002 may be a graphics core or cores.

Figure 10:
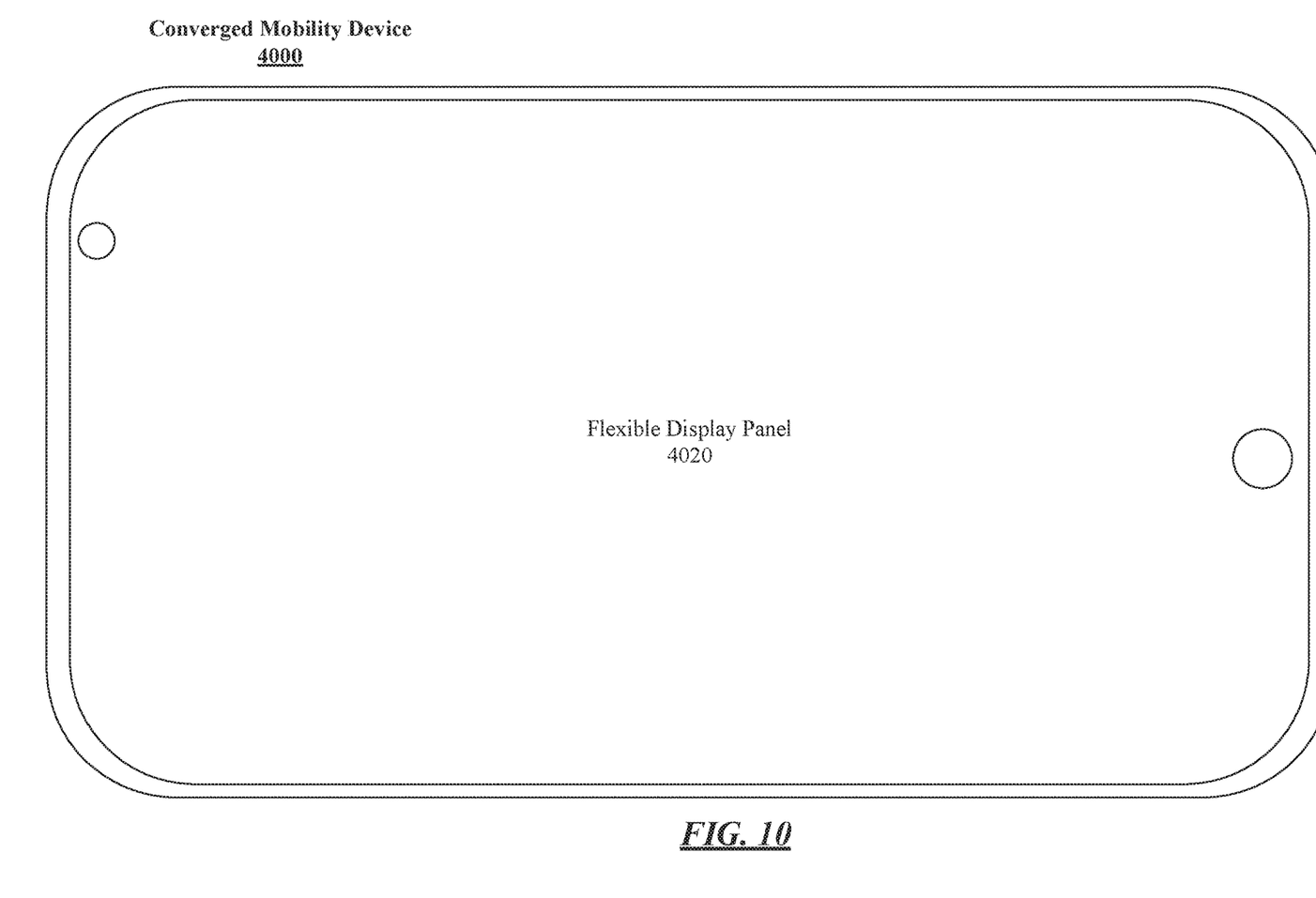
FIG. 10 illustrates an embodiment of a device.

FIG. 10 is a diagram of an exemplary diagram of a mobile device 4000, which includes a flexible display panel 4020. The flexible display panel 4020 can include a display panel having a flexible display panel stack (e.g., the flexible display panel stack 110, or the like) and a bending detection sensor (e.g., the bending detection sensor 120, bending detection sensor 300, bending detection sensor 400, or the like). The mobile device 4000 may be a tablet computer, a smart phone, a wearable device, or other device having a display panel 4020, which can be flexible.

Some embodiments may be described using the expression "one embodiment" or "an embodiment" along with their derivatives. These terms mean that a feature, structure, or characteristic described relating to the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment for streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the Plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The following examples pertain to further embodiments, from which numerous permutations and configurations will be apparent.

Example 1

A bending detection sensor, comprising: a flexible substrate; a plurality of sensor elements formed on the flexible substrate, each of the plurality of sensor elements to have an electric response that changes in response to physical force applied to the sensor element; and a bend sensing circuit coupled to the plurality of sensor elements, the bend sensing circuit to measure the electrical response of the plurality of sensor elements.

Example 2

The bending detection sensor of claim 1, comprising spacers disposed on the flexible substrate, the spacers to couple the flexible substrate to a flexible display panel stack.

Example 3

The bending detection sensor of claim 1, wherein the flexible substrate is implemented in a flexible display panel stack.

Example 4

The bending detection sensor of claim 1, comprising: a processor coupled to the bend sensing circuit; and memory comprising instructions, which when executed by the processor cause the processor to: send a control signal to the bend sensing circuit to cause the bend sensing circuit to apply an electric signal to the plurality of sensor elements; receive an indication of the electric response of the plurality of sensor elements to the electric signal; and determine a degree of bending of the flexible substrate based in part on the electric response.

Example 5

The bending detection sensor of claim 4, a resistance of each the plurality of sensor elements to change in response to physical force applied to each of the plurality of sensor elements.

Example 6

The bending detection sensor of claim 5, the bend sensing circuit to comprise at least one capacitor coupled to the plurality of sensor elements arranged to measure a time delay of each of the plurality of sensor elements to the applied electric signal.

Example 7

The bending detection sensor of claim 6, the memory comprising a time delay table comprising indications of a degree of bending corresponding to a plurality of time delay values and further comprising instruction that when executed by the processor cause the processor to determine the degree of bending based in part of the time delay of each of the plurality of sensor elements and the plurality of time delay values in the time delay table.

Example 8

A flexible display comprising: a flexible display panel stack, comprising: a flexible substrate; an array of switching elements formed on the flexible substrate; and an array of illumination elements formed on the flexible substrate, the array of illumination elements coupled to the array of switching elements; and a bending detection sensor, comprising: a flexible sensor substrate; a plurality of sensor elements formed on the flexible sensor substrate, each of the plurality of sensor elements to have an electric response that changes in response to physical force applied to the sensor element; and a bend sensing circuit coupled to the plurality of sensor elements, the bend sensing circuit to measure the electrical response of the plurality of sensor elements.

Example 9

The flexible display of claim 8, comprising spacers disposed between the flexible substrate and the flexible sensor substrate, the spacers to couple the flexible display panel stack to the bending detection sensor.

Example 10

The flexible display of claim 8, wherein the flexible substrate and the flexible sensor substrate the same, the array of switching elements and the array of illumination elements formed on a front side of the flexible substrate and the plurality of sensor elements formed on a back side of the flexible substrate.

Example 11

The flexible display of claim 8, the bending detection sensor comprising: a processor coupled to the bend sensing circuit; and memory comprising instructions, which when executed by the processor cause the processor to: send a control signal to the bend sensing circuit to cause the bend sensing circuit to apply an electric signal to the plurality of sensor elements; receive an indication of the electric response of the plurality of sensor elements to the electric signal; and determine a degree of bending of the flexible substrate based in part on the electric response.

Example 12

The flexible display of claim 11, a resistance of each the plurality of sensor elements to change in response to physical force applied to each of the plurality of sensor elements.

Example 13

The flexible display of claim 12, the bend sensing circuit to comprise at least one capacitor coupled to the plurality of sensor elements arranged to measure a time delay of each of the plurality of sensor elements to the applied electric signal.

Example 14

The flexible display of claim 13, the memory comprising a time delay table comprising indications of a degree of bending corresponding to a plurality of time delay values and further comprising instruction that when executed by the processor cause the processor to determine the degree of bending based in part of the time delay of each of the plurality of sensor elements and the plurality of time delay values in the time delay table.

Example 15

A mobile device, comprising: a flexible display panel, comprising: a flexible substrate; an array of switching elements formed on the flexible substrate; and an array of illumination elements formed on the flexible substrate, the array of illumination elements coupled to the array of switching elements; a bending detection sensor, comprising: a flexible sensor substrate; a plurality of sensor elements formed on the flexible sensor substrate, each of the plurality of sensor elements to have an electric response that changes in response to physical force applied to the sensor element; and a bend sensing circuit coupled to the plurality of sensor elements, the bend sensing circuit to measure the electrical response of the plurality of sensor elements; a display controller coupled to the flexible display panel stack; a processor coupled to the display controller and the bending detection sensor; and memory coupled to the processor, the memory comprising instructions, which when executed by the processor cause the processor to: receive, from the bending detection sensor, an indication of the electric response; determine, based at least in part on the electric response, a degree of bending of the flexible substrate; and adjust an image to be displayed on the flexible display based in part on the determined degree of bending.

Example 16

The mobile device of claim 15, comprising spacers disposed between the flexible substrate and the flexible sensor substrate, the spacers to couple the flexible display panel to the bending detection sensor.

Example 17

The mobile device of claim 15, wherein the flexible substrate and the flexible sensor substrate the same, the array of switching elements and the array of illumination elements formed on a front side of the flexible substrate and the plurality of sensor elements formed on a back side of the flexible substrate.

Example 18

The mobile device of claim 15, the memory further comprising instructions that when executed by the processor cause the processor to: send a control signal to the bend sensing circuit to cause the bend sensing circuit to apply an electric signal to the plurality of sensor elements; and receive the indication of the electric response, responsive to the applied electric signal.

Example 19

The mobile device of claim 18, a resistance of each the plurality of sensor elements to change in response to physical force applied to each of the plurality of sensor elements.

Example 20

The mobile device of claim 19, the bend sensing circuit to comprise at least one capacitor coupled to the plurality of sensor elements arranged to measure a time delay of each of the plurality of sensor elements to the applied electric signal.

Example 21

The mobile device of claim 20, the memory comprising a time delay table comprising indications of a degree of bending corresponding to a plurality of time delay values and further comprising instruction that when executed by the processor cause the processor to determine the degree of bending based in part of the time delay of each of the plurality of sensor elements and the plurality of time delay values in the time delay table.

Example 22

A method, comprising: receiving, from a bending detection sensor, an indication of the electric response, the bending detection sensor, comprising: a plurality of sensor elements formed on a flexible substrate, each of the plurality of sensor elements to have an electric response that changes in response to physical force applied to the sensor element; determining, based at least in part on the electric response, a degree of bending of the flexible substrate; and adjusting an image to be displayed on a flexible display panel based in part on the determined degree of bending, the flexible display panel, comprising: the flexible substrate; an array of switching elements formed on the flexible substrate; and an array of illumination elements formed on the flexible substrate, the array of illumination elements coupled to the array of switching elements.

Example 23

The method of claim 22, wherein the array of switching elements and the array of illumination elements are formed on a front side of the flexible substrate and the plurality of sensor elements formed on a back side of the flexible substrate.

Example 24

The method of claim 22, comprising sending a control signal to a bend sensing circuit to cause the bend sensing circuit to apply an electric signal to the plurality of sensor elements; and receiving the indication of the electric response, responsive to the applied electric signal.

Example 25

The method of claim 24, a resistance of each the plurality of sensor elements to change in response to physical force applied to each of the plurality of sensor elements.

Example 26

The method of claim 25, the bend sensing circuit to comprise at least one capacitor coupled to the plurality of sensor elements arranged to measure a time delay of each of the plurality of sensor elements to the applied electric signal.

Example 27

The method of claim 26, comprising determining the degree of bending based in part on a time delay table comprising indications of a degree of bending corresponding to a plurality of time delay values and the time delay of each of the plurality of sensor elements and the plurality of time delay values in the time delay table.

Example 28

An apparatus, comprising: means arranged to implement the function of any one of claims 22 to 27.

Example 29

At least one non-transitory computer-readable storage medium comprising instructions that when executed by a computing device, cause the computing device to perform the method of any one of claims 22 to 27.

The invention claimed is:

1. A bending detection sensor, comprising:
a flexible substrate;
a bending detection sensor disposed on the flexible substrate, the bending detection sensor comprising:
a plurality of conductive nanowires formed on the flexible substrate, each of the plurality of conductive nanowires to have an electric response that changes in response to physical force applied to the bending detection sensor, the plurality of conductive nanowires comprising copper, and
a carbon film disposed on the plurality of conductive nanowires such that the plurality of conductive nanowires are disposed between the flexible substrate and the carbon film; and
a bend sensing circuit coupled to the bending detection sensor, the bend sensing circuit to:
measure a time delay of the electrical response of each of the plurality of conductive nanowires; and
determine a degree of bending of the flexible substrate based in part on the time delay of the electrical response of each of the plurality of conductive nanowires.

2. The bending detection sensor of claim 1, comprising spacers disposed on the flexible substrate, the spacers to couple the flexible substrate to a flexible display panel stack.

3. The bending detection sensor of claim 1, wherein the flexible substrate is implemented in a flexible display panel stack.

4. The bending detection sensor of claim 1, the bend sensing circuit comprising:
a processor; and
memory comprising instructions, which when executed by the processor cause the processor to:
send a control signal to a voltage source to cause the voltage source to apply a voltage potential to the plurality of conductive nanowires;
determine the time delay of the electrical response of each of the plurality of conductive nanowires to the applied voltage potential; and
determine the degree of bending of the flexible substrate based in part on the time delay.

5. The bending detection sensor of claim 4, a resistance of each the plurality of conductive nanowires to change in response to physical force applied to each of the plurality of conductive nanowires.

6. The bending detection sensor of claim 4, the memory comprising a time delay table comprising indications of a degree of bending corresponding to a plurality of time delay values and the memory further comprising instruction that when executed by the processor cause the processor to determine the degree of bending based in part of the time delay of each of the plurality of conductive nanowires and the plurality of time delay values in the time delay table.

7. A flexible display comprising:
a flexible display panel stack, comprising:
a flexible substrate,
an array of switching elements formed on the flexible substrate, and
an array of illumination elements formed on the flexible substrate, the array of illumination elements coupled to the array of switching elements;
a bending detection sensor, comprising:
a flexible sensor substrate,
a plurality of conductive nanowires formed on the flexible sensor substrate, each of the plurality of conductive nanowires to have an electric response that changes in response to physical force applied to the bending detection sensor, the plurality of conductive nanowires comprising copper, and a carbon film disposed on the plurality of conductive nanowires such that the plurality of conductive nanowires are disposed between the flexible substrate and the carbon film; and a bend sensing circuit coupled to the bending detection sensor, the bend sensing circuit to:

measure a time delay of the electrical response of each of the plurality of conductive nanowires, and determine a degree of bending of the flexible substrate based in part on the time delay of the electrical response of each of the plurality of conductive nanowires.

8. The flexible display of claim 7, comprising spacers disposed between the flexible substrate and the flexible sensor substrate, the spacers to couple the flexible display panel stack to the bending detection sensor.

9. The flexible display of claim 7, wherein the flexible substrate and the flexible sensor substrate are the same, the array of switching elements and the array of illumination elements formed on a front side of the flexible substrate and the plurality of conductive nanowires formed on a back side of the flexible substrate.

10. The flexible display of claim 7, the bend sensing circuit comprising:

a processor; and memory comprising instructions, which when executed by the processor cause the processor to:

send a control signal to a voltage source to cause the voltage source to apply a voltage potential to the plurality of conductive nanowires;

determine the time delay of the electrical response of each of the plurality of conductive nanowires to the applied voltage potential; and determine the degree of bending of the flexible substrate based in part on the time delay.

11. The flexible display of claim 10, a resistance of each the plurality of conductive nanowires to change in response to physical force applied to each of the plurality of conductive nanowires.

12. The flexible display of claim 10, the memory comprising a time delay table comprising indications of a degree of bending corresponding to a plurality of time delay values and the memory further comprising instruction that when executed by the processor cause the processor to determine the degree of bending based in part of the time delay of each of the plurality of conductive nanowires and the plurality of time delay values in the time delay table.

13. A mobile device, comprising:

a flexible display panel, comprising:

a flexible substrate, an array of switching elements formed on the flexible substrate, and an array of illumination elements formed on the flexible substrate, the array of illumination elements coupled to the array of switching elements;

a bending detection sensor, comprising:

a flexible sensor substrate, a plurality of conductive nanowires formed on the flexible sensor substrate, each of the plurality of conductive nanowires to have an electric response that changes in response to physical force applied to the bending detection sensor, the plurality of conductive nanowires comprising copper, and a carbon film disposed on the plurality of conductive nanowires such that the plurality of conductive nanowires are disposed between the flexible substrate and the carbon film; and a bend sensing circuit coupled to the bending detection sensor, the bend sensing circuit to measure a time delay of the electrical response of each of the plurality of conductive nanowires;

a display controller coupled to the flexible display panel;

a processor coupled to the display controller and the bending detection sensor; and memory coupled to the processor, the memory comprising instructions, which when executed by the processor cause the processor to:

determine the time delay of the electrical response of each of the plurality of conductive nanowires;

determine, based at least in part on the time delay, a degree of bending of the flexible substrate; and adjust an image to be displayed on the flexible display based in part on the determined degree of bending.

14. The mobile device of claim 13, comprising spacers disposed between the flexible substrate and the flexible sensor substrate, the spacers to couple the flexible display panel to the bending detection sensor.

15. The mobile device of claim 13, wherein the flexible substrate and the flexible sensor substrate are the same, the array of switching elements and the array of illumination elements formed on a front side of the flexible substrate and the plurality of conductive nanowires formed on a back side of the flexible substrate.

16. The mobile device of claim 13, the memory further comprising instructions that when executed by the processor cause the processor to:

send a control signal to a voltage source to cause the voltage source to apply a voltage potential to the plurality of conductive nanowires; and receive an indication of the time delay responsive to the applied votlage potential.

17. The mobile device of claim 16, a resistance of each the plurality of conductive nanowires to change in response to physical force applied to each of the plurality of conductive nanowires.

18. The mobile device of claim 16, the memory comprising a time delay table comprising indications of a degree of bending corresponding to a plurality of time delay values and the memory further comprising instruction that when executed by the processor cause the processor to determine the degree of bending based in part of the time delay of each of the plurality of conductive nanowires and the plurality of time delay values in the time delay table.

* * * * *

UNITED STATES PATENT AND TRADEMARK OFFICE
CERTIFICATE OF CORRECTION

PATENT NO. : 11,015,991 B2
APPLICATION NO. : 16/219012
DATED : May 25, 2021
INVENTOR(S) : Khaled Ahmed and Michael Rosenzweig Page 1 of 1

It is certified that error appears in the above-identified patent and that said Letters Patent is hereby corrected as shown below:

In the Claims

Column 14 Claim 16, Line 46, "votlage" should be "voltage"

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*